United States Patent Office 3,734,780
Patented May 22, 1973

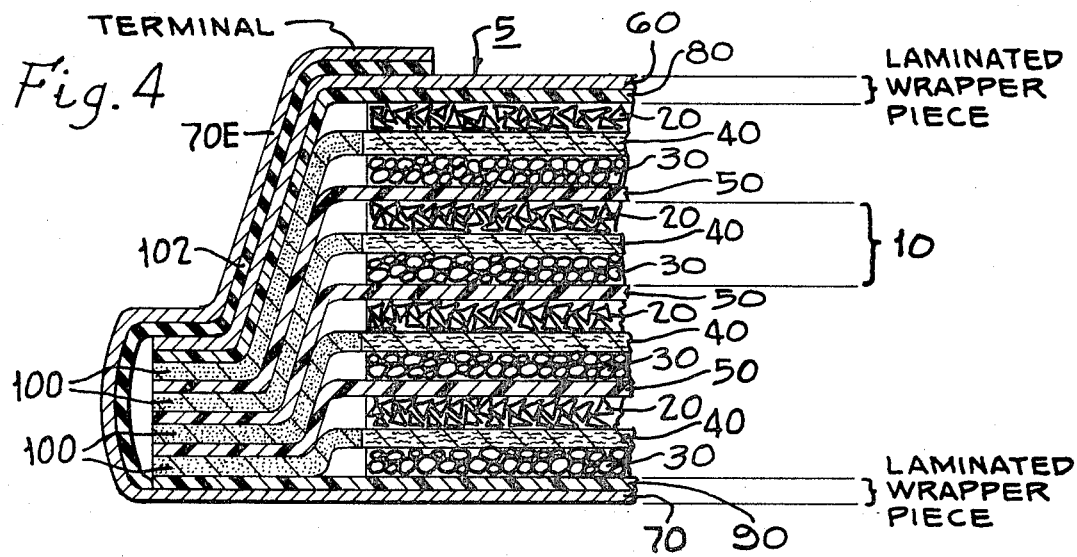
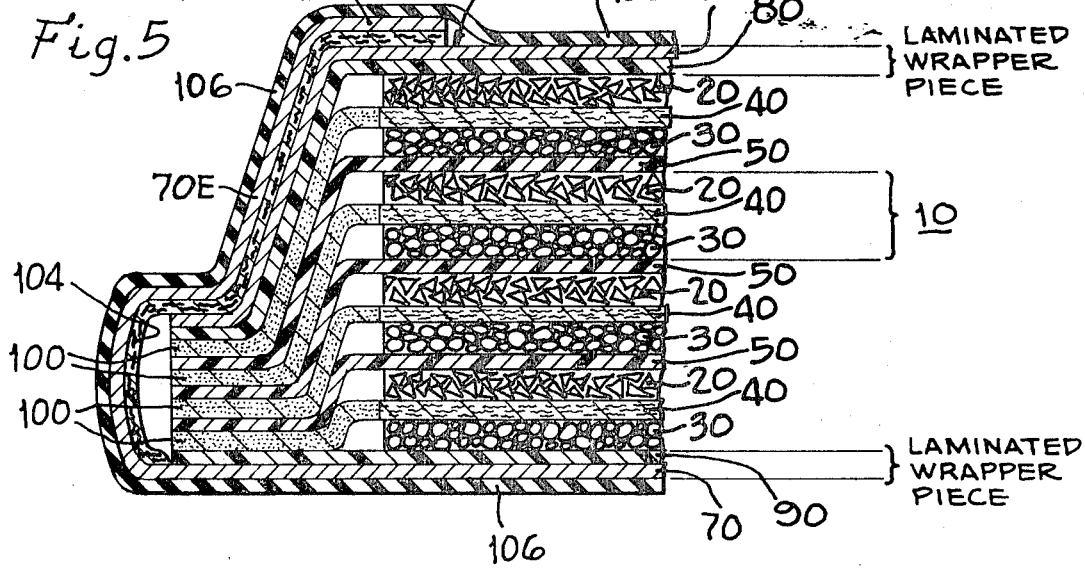

3,734,780
FLAT CELL BATTERY WITH BOTH TERMINALS ON ONE FACE
John M. Bilhorn, Edgerton, and Bernard C. Bergum and Kent V. Anderson, Madison, Wis., assignors to ESB Incorporated
Filed June 25, 1971, Ser. No. 156,804
Int. Cl. H01m 21/00
U.S. Cl. 136—111                              7 Claims

ABSTRACT OF THE DISCLOSURE

A flat cell battery has a wrapper consisting of two pieces, each of which is in contact with an end electrode so as to serve as a battery terminal. One of these wrapper pieces or a laminated layer thereof is wrapped around the edge of the battery and overlays the other wrapper piece to produce a battery having both terminals on one face. Preferably the wrapper pieces are laminates of metal and electrically conductive plastic, with the plastic being in contact with the end electrodes and an extension of the metal in the laminate serving as the terminal which is wrapped around the edge of the battery. The wrapped around extension, which must be electrically insulated from the wrapper piece over which it is overlaid, may be secured to the other wrapper piece by nonconductive adhesives or heat seals.

BACKGROUND OF THE INVENTION

Flat, multicell batteries have been constructed for many years by stacking individual cells on top of one another and connecting them together in series. These batteries have terminals of opposite polarity which are physically located at the opposite sides of the battery. There is good reason to locate both terminals on a common side of the battery since it is generally easier to connect the battery to its appliance if the appliance connection terminals can be located in a common plane. This is especially true where a flat cell battery operates a flat pack appliance, or it otherwise located with one side adjacent to appliance parts, so that one side of the flat cell battery is in such a position as to make contact difficult or otherwise undesirable.

Various ways have been devised to bring one terminal around the exterior of the flat cell batteries so as to have both terminals on one side, but such methods have been generally unsatisfactory either from point of cost of materials, cost of labor, added thickness to the battery, or contact resistance.

In all flat cell batteries a moisture barrier is essential to extend shelf life. In some constructions this is accomplished by a polymeric coating such as a wax dip or by a plastic sleeve sealed at the ends and having terminal protrusions.

In another previously filed application, Ser. No. 99,985, it has been proposed to build a battery having a wrapper which consists of two pieces sealed around their perimeters. Each wrapper piece comprises a laminate of metal and electrically conductive plastic, the conductive plastic in each of the laminates being in contact with an end electrode within the battery. The wrapper pieces are closed around the perimeters of the electrodes to produce a liquid impervious sealed battery. The wrapper pieces provide superior moisture retention and therefore increase the shelf life of the battery. Another of their advantages is the fact that they can be placed directly in contact with the end electrodes without producing any undesired electrochemical reactions. Still another and an important advantage of the laminated wrapper pieces is the relative conductivities of the conductive plastics and the metals. Conductive plastics tend to be good conductors of electricity in their transverse direction, i.e., across their thicknesses, but they are poorer conductors of electrical current in their longitudinal direction. The metal, on the other hand, is a good conductor in all directions and is therefore well suited to collect current all along its interface with the adjacent conductive plastic and to conduct that current longitudinally to a terminal.

SUMMARY OF THE INVENTION

This invention consists of an improvement in flat cell batteries which improvement requires the use of two wrapper pieces. Each wrapper piece is in contact with an end electrode of the battery so as to serve as a current collector for that electrode, as a terminal for the battery, and as a moisture barrier. The wrapper pieces are sealed around the perimeter of the electrodes by moisture impervious, electrically nonconductive sealing means. An extension of one of the wrapper pieces is wrapped around the edge of the battery and overlays the other wrapper piece. The wrapped around extension, which must be electrically insulated from the wrapper piece over which it is overlaid, may be secured to the other wrapper piece by nonconductive sealing means such as nonconductive adhesives, heat seals, and various pressure sensitive coated materials.

It is preferred to use the laminates of conductive plastic and metal of Ser. No. 99,985 as the wrappers used in this invention, in which case this invention represents an improvement over the one of Ser. No. 99,985. In that case the plastic in each laminated wrapper piece is in contact with one of the end electrodes. Also in that case it is preferred to extend the metal in one of the wrapper pieces beyond the edge of the laminate of which it is a component, wrap that extension around the edge of the battery, and overlay that extension on top of the other wrapper piece.

BRIEF DESCRIPTION OF THE DRAWINGS

FIG. 2 shows the metal of a metal-conductive plastic laminated wrapper piece being wrapped around the edge of the battery and secured to the wrapper piece over which it is overlaid by an electrically nonconductive adhesive.

FIG. 4 differs from FIG. 2 by having the metal extension secured to the other wrapper piece by an electrically nonconductive heat seal.

FIG. 5 differs from FIG. 2 by having a nonconductive paper interposed between the metal extension and the wrapper piece over which it is overlaid and by having the battery enclosed within a nonconductive plastic film.

DESCRIPTION OF THE PREFERRED EMBODIMENTS

Figure 1:
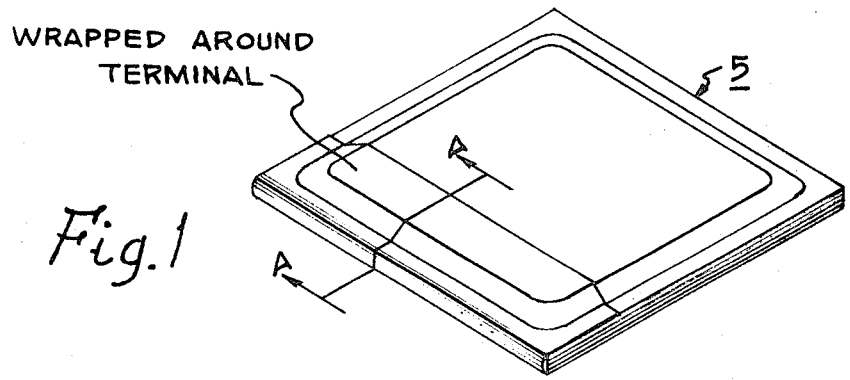
FIG. 1 is a pictorial view of a flat multicell battery having both terminals on one face.
Figure 2:
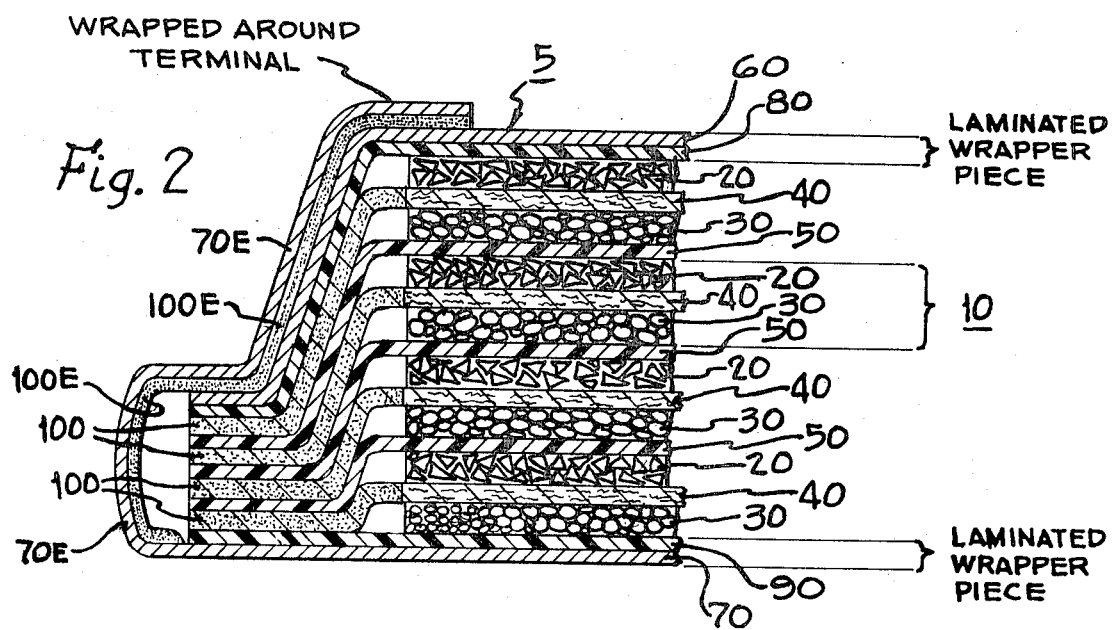
FIG. 2 illustrates a cross-section of the battery shown in FIG. 1 taken along the line A—A of FIG. 1. The thickness of the battery is shown greatly magnified for purposes of illustration.

FIG. 1 shows a flat multicell battery 5 in a pictorial view. FIG. 2 shows a portion of the multicell battery 5 in magnified cross-section. As FIG. 2 shows, the battery 5 comprises the combination of at least two cells 10, each such cell comprising a positive electrode 20, a negative electrode 30, and an electrolyte impregnated separator 40 between the positive electrode 20 and the negative electrode 30. Between each adjacent pair of cells 10 is an impervious intercell connector 50. Portions of the separator extending beyond the edges of the electrodes are impregnated with electrically nonconductive adhesive 100 to provide a liquid impervious seal between and around the perimeters of the intercell connectors. A single cell battery similar to the one shown in FIG. 2 would contain only one cell 10 and no intercell connectors.

The multicell battery also requires a liquid impervious wrapper to be sealed around the outermost cells. As it pertains to the present invention, that wrapper consists of two pieces, each of which preferably comprises a laminate of metal and electrically conductive plastic. FIG. 2 illustrates these two preferred wrapper pieces, one piece 60-80 comprising a laminate of metal 60 and electrically conductive plastic 80 in which the plastic 80 is in contact with the positive electrode 20 in one of the end cells and the other piece 70-90 comprising a laminate of metal 70 and electrically conductive plastic 90 in which the plastic 90 is in contact with the negative electrode 30 in the other end cell. One advantage of the laminated wrapper pieces is that conductive plastics may be placed in direct contact with the electrodes so that the conductive plastics function as current conductors. It will be noted that the conductive plastic will not produce an undesired electrochemical reaction when placed in direct contact with the positive electrode, and so it is unnecessary to interpose between them a deposit of conductive adhesive to prevent such reactions.

Another advantage of the laminated wrapper pieces is the relative conductivities of the conductive plastics and the metals. Conductive plastics tend to be good conductors of electricity in their transverse direction, that is, across their thicknesses, but they are poorer conductors of electrical current in their longitudinal direction. The metal, on the other hand, is a good conductor in all directions and is therefore well suited to collect current all along its interface with the adjacent conductive plastic and to conduct that current longitudinally to a terminal.

Still another advantage of the metal-conductive plastic laminates is their superior resistance of the penetration of moisture. One of the greatest limitations to long shelf life in a battery is the problem of having moisture from the electrolyte slowly escape from the battery before the battery is placed into service. One of the ways in which this moisture can escape is by penetration through the wrapper. The laminated wrapper pieces reduce the opportunities for such moisture penetration by providing a double moisture barrier around the battery. The inner plastic layers prevent the passage of moisture in the form of liquid, although the tiny pores which are occasionally found in plastics may allow the slow passage of vapors; but the other metal layers, which are substantially free of these pores, act as vapor barriers. A further advantage of the metal in the laminated wrapper is the increased area on which to make terminal contacts. Additionally, thin foils of metal allow more flexible constructions.

The metal layers 60 and 70 may be thin sheets or foils; alternatively they might be thin spray or vacuum deposits or electrodeposits, in which case they may be deposited on a substrate (e.g., the electrically conductive plastic or a nonconductive material) if they are not self-supporting. Preferably, however, the metals 60 and 70 are thin foils of steel which may have a tin coating to decrease contact resistance. Such steel foils are readily available, relatively inexpensive, good electrical conductors, and are generally free of pores. They may also be laminated to some conductive plastics by the application of heat and pressure, without requiring any intermediary adhesives between them. The steel foils can be purchased in rolls of great length and are thus well suited for use in high speed, continuously operating production machinery. Foils of aluminum, lead, zinc and a wide variety of other metals may also be used.

The conductive plastics may be produced by casting, extrusion, calendering or other suitable techniques. The conductive plastics may be made, for example, from materials such as polymers loaded with electrically conductive particles and containing various stabilizers and/or plasticizers, or from conductive polymers. The conductive particles may be carbonaceous materials such as graphite or acetylene black, or metallic particles may also be used. The conductive plastic, whether loaded or unloaded, must be made from a composition which is compatible with the other components of the battery. For batteries using LeClanche and moderately concentrated alkaline electrolytes, the conductive plastic may be made for example, from materials such as polyacrylates, polyvinyl halides, polyacrylonitriles, copolymers of vinyl chloride and vinylidene chloride, polychloroprene, and butadiene-styrene or butadiene-acrylonitrile resins. For batteries using strongly alkaline electrolyte, polyvinylchloride and polyolefins such as polyethylene and polyisobutylene may be used in the preparation of the conductive plastic. For batteries using acid electrolytes such as sulfuric acid, polyvinyl halides, copolymers of vinyl chloride, and vinylidene chloride may be used.

The laminated wrapper pieces may, of course, also be used with single cell batteries. In such cases there is only one cell 10, there are no intercell connectors 50, and an electrically nonconductive sealing means such as sealer 100 shown in FIG. 2 must be used between the laminated wrapper pieces. Except for these changes, the remarks made above in regard to multicell batteries are applicable also to single cell batteries.

Batteries having wrappers comprising the two laminated pieces described above are the subject matter claimed in Ser. No. 99,985.

FIG. 2 illustrates how the laminated wrapper pieces of Ser. No. 99,985 may be used to provide the wrapped around terminal which is the feature of this invention. As shown in FIG. 2, extension 70E of the lower wrapper piece extends beyond the edge of the laminate 70-90, the metallic extension 70E being wrapped around the edge of the battery 5 to overlay the other wrapper piece 60-80. The wrapped around extension 70E applies substantially no crimping forces against the wrapper piece 60-80 over which it is overlaid. The metallic extension 70E is electrically insulated from but secured to the upper wrapper piece 60-80 by an electrically nonconductive adhesive 100E. The adhesive 100E preferably coats the inside surface of the metallic extension 70E to prevent electrical conductivity between that extension and the edges of any of the intercell connector 50. The preferred wrapped around terminal could be sealed to the bottom rather than to the top side of the battery by extending the metal 60 of the upper laminate piece 60-80 around the edge of the battery and adhering it to the bottom laminate piece 70-90. The extension of the metal in one of the laminates to serve as the wrapped around terminal provides a member having very good electrical conductivity.

Figure 3:
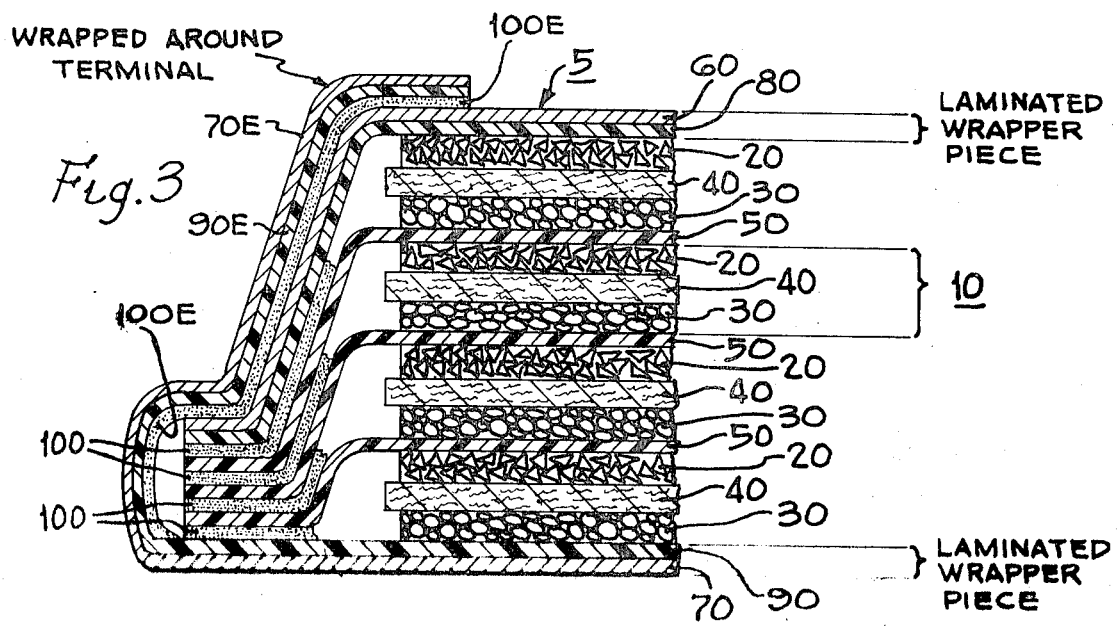
FIG. 3, which shows an alternative to the construction illustrated in FIG. 2, shows both the metal and the plastic of a metal-conductive plastic laminated wrapper piece being wrapped around the battery and secured to the other wrapper piece by an electrically nonconductive adhesive.

FIG. 3 shows an alternative construction in which the entire laminate 70-90 is extended around the edge of the battery so that extensions 70E and 90E are used to provide the wrapped around terminal. FIG. 3 also differs from FIG. 2 by having the separators 40 extend only slightly beyond the edges of the electrodes 20 and 30 rather than to the edges of the intercell connectors and by using deposits of electrically nonconductive adhesives 100 around the perimeters of the intercell connectors which are not impregnated into the separators.

FIG. 4 shows a construction which differs from the one appearing in FIG. 2 by having an electrically nonconductive, heat sealable mamber 102 rather than a nonconductive adhesive interposed between metallic extension 70E and the upper wrapper piece 60–80. The member 102 may be heat sealed to both the metallic extension 70E and the upper wrapper piece 60–80 so as to secure the metallic extension and the upper wrapper piece together. The nonconductive, heat sealable members may be made from such materials as polystyrene, polyvinyl chloride, acrylonitryl butadiene styrene, phenolics, vinylidine chloride, cellophane, cellulose acetate, polyurethane films, natural and artificial rubbers, and others.

A construction similar to the one shown in FIG. 4 may also be built by cementing nonconductive member 102 to both the metallic extension 70E and the upper wrapper piece 60–80 with an adhesive.

FIG. 5 shows a construction in which the metallic extension 70E of the lower laminated wrapper piece 70–90 is wrapped around the edge of the battery to overlay the other wrapper piece 60–80. An electrically nonconductive, nonsecuring (i.e., nonadhesive, non-heat sealing, etc.) member 104 is interposed between the extension 70E and the wrapper piece 60–80. Such members 104 may be made from a wide variety of materials including papers, felts, and fabrics composed of natural or synthetic fibers as well as continuous films of cellophane, polyolefins, cellulose acetate, and many others. Also shown in FIG. 5 is an enclosure member 106 which may be placed around the battery for such purposes as electrical insulation, improved moisture retention and others. Enclosure member 106 may comprise a single component as shown in FIG. 5 or it may include two or more components which cooperate to produce the desired results. Enclosure member 106 may be used to hold the metallic extension 70E and the nonsecuring member 104 closely against the upper wrapper piece 60–80.

While the preferred constructions have been shown in the drawings and described above, other embodiments are also possible. As one example, the metallic foils 60 and 70 illustrated in the drawings may be replaced with metal flame sprays or with films impregnated with metallic or other conductive particles and applied by casting, doctor blading, or other techniques. As another example, the battery could have a pair of wrapper pieces each of which consisted of only electrically conductive plastic, analogous to components 80 and 90 shown in FIGS. 2 through 5; such a construction, while functional, does not provide the same high degree of moisture retention in the battery as do the metal-plastic laminates and, in addition, the plastic is a poorer longitudinal conductor. As another example, the battery could have a pair of wrapper pieces each of which consisted of only metal, the surface of the metal which is in contact with the end electrodes being electrochemically inert with respect to the other battery components; such metals, which might be of homogeneous composition or which might comprise one metal clad or coated with another, may be more expensive compared with the preferred plastic-metal laminates. Still another alternative is to use a pair of wrapper pieces each of which consisted of metal coated on the inside with an electrically conductive adhesive which would prevent undesired electrochemical reactions between the metallic wrapper pieces and other components of the battery.

The composition of each of several of the other members in the battery may take alternative forms, and the composition of those members will now be discussed.

The positive electrodes 20 may comprise particles of electrochemically positive active material contained in and dispersed throughout a binder matrix. The positive active material conventionally is divided into tiny particles so as to increase the ratio of total surface area to weight in the active material and thereby increase the rate at which the elecrochemical reactions can occur by increasing the surface areas where they occur. The binder increases the electronic conductivity and the structural integrity within the electrodes. Since electrolyte must have access to the surface of the active material particles, the electrode must be made sufficiently porous so that the electrolyte may diffuse throughout the electrode rapidly and thoroughly. Preferably the pores in the electrode are produced by the evaporation of liquid during the construction of the electrode; the evaporating liquid may be part of a dispersion binder system in which the solid binder contained in the finally constructed electrode comprises tiny particles of binder material dispersed throughout and not dissolved in the liquid while the electrode is being constructed, or the evaporating liquid may be part of a solution binder system in which the solid binder contained in the finally constructed electrode is dissolved in the liquid which is later evaporated. The porosity of the positive electrodes may be increased as the discharge rate desired in the battery is increased. Electrodes may also be constructed using combinations of the dispersion and solution systems. Alternatively, the pores might be produced by the dissolving of a solid which was present during construction of the electrode or by passing gases through or generating gases within the electrodes at controlled rates during electrode construction. The positive electrodes 20 may, and preferably will, also contain amounts of good electrical conductor such as carbon or graphite to improve the electrical conductivity between the active material particles, the positive active material particles themselves generally being relatively poor conductors of electricity. The conductivity of the active material particles together with the conductivity of the binder itself will influence the amounts of conductors added to the electrode. The electrodes 20 may also contain if desired small amounts of additional ingredients used for such purposes as maintaining uniform dispersion of active material particles during electrode construction, aiding the diffusion of electrolyte through the pores of the finally constructed electrodes, controlling viscosity during processing, controlling surface tension, controlling pot life, or for other reasons.

The negative electrodes 30 may comprise spray or vapor deposits of metals or may comprise tiny particles of metals contained in and dispersed throughout a binder matrix. If the negative electrodes utilize a binder matrix, in general the same considerations regarding that matrix apply to the negative electrodes as do for the positive electrodes except that no electrical conductor may be needed to achieve desired electrical conductivity between the active material particles since the negative active materials are generally better conductors than are the positive materials. When the negative electrodes utilize a binder matrix, the binder system need not be the same as the one used in the positive electrodes, and even if it is the proportions of binder, active material particles, and other ingredients in the negative electrodes may have a different optimum than the proportions of analogous ingredients in the positive electrode. The initial porosity of the negative electrodes may sometimes be less than that of the positive electrodes, since the negative electrode discharge reaction products are sometimes dissolved in the battery electrolyte. The porosity of the negative electrodes may be increased as the discharge rate desired in the battery is increased. The negative electrodes 30 may also comprise thin sheets or foils or electrodeposits of electrochemically negative material.

Between the two electrodes in each cell is an electrolyte impregnated separator 40, the theoretical requirements of which are that it contain electrolyte as well as physically separate and prevent contact between the electrodes. A deposit of gelled electrolyte could by itself serve both functions if of proper thickness and/or consistency. The alternative construction uses a deposit of gelled or fluid electrolyte with a separator which is distinct from and in addition to the electrolyte, the separator providing added insurance against direct contact between the electrodes and acting as an absorbent material into which the electrolyte may be impregnated. Both alternative constructions may, however, be viewed as being forms of electrolyte impregnated separators. Where the separator is distinct from and in addition to the electrolyte, the separator may be made from a wide variety of materials including the fibrous and cellulosic materials which are conventional in battery construction as well as from woven or non-woven fibrous materials such as polyester, nylon, polypropylene, polyethylene and glass.

Between each consecutive pair of cells is an impervious intercell connector 50 which may take several different embodiments. Regardless of the specific embodiment, the impervious intercell connector 50 must meet three essential requirements: it must be impervious to the electrolyte of the battery so that one cell may be sealed off from the next; it must provide some means by which electrical current may be conducted between the positive electrode in one cell and the negative electrode in the next cell; and it must not create any undesired electrochemical reactions with the electrodes or other components of the battery.

The particular embodiment of the impervious intercell connector shown in FIGS. 2–5 may be a sheet or film of electrically conductive plastic. Alternative embodiments of the impervious intercell connector may be achieved with metal foils, conductive adhesives or combinations of them, since with the use of metal foils it may be necessary or desirable to interpose a layer of conductive adhesive or other conductive polymer between the foil and the positive electrode 20 to prevent the foil from engaging in an undesired electrochemical reaction with the positive electrode or the electrolyte. The impervious intercell connector 50 may also be a combination of an electrically nonconductive member such as plastic, with one or more members of electrically conductive material extending around the edge of or through the nonconductive member to conduct electrical current between the positive electrode in one cell and the negative electrode in the next consecutive cell.

Liquid impervious seals must be provided between each intercell connector 50 to prevent the escape of moisture from the interior of the battery. Adhesive means for achieving this sealing are shown in FIGS. 2–5 as items 100. If the adhesive is made from an electrically nonconductive material, members 100 may serve an additional purpose, that of preventing undesired electrical connections between two or more electrically conductive members of the battery. Where the edges of the intercell connectors are themselves electrically nonconductive, as they may be in the case of intercell connectors comprising a combination of electrically nonconductive plastic with one or more conductive members extending around the edge of or through the nonconductive plastic, the nonconductive perimeters of the intercell connectors may serve as the sealing means by being sealed with the application of heat and/or pressure or by some other technique.

While it is preferred to employ the LeClanche electrochemical system (comprising manganese dioxide positive active material, zinc negative active material, and an electrolyte comprising ammonium chloride and/or zinc chloride), the battery 5 of this invention may employ a wide variety of electrochemical systems including both primary and secondary systems. Among the positive electrode materials are such commonly used inorganic metal oxides as manganese dioxide, lead dioxide, nickel oxyhydroxide, mercuric oxide, and silver oxide, inorganic metal halides such as silver chloride and lead chloride, and organic materials capable of being reduced such as dinitrobenzene and azodicarbonamide compounds. Among the negative electrode materials are such commonly used metals as zinc, aluminum, magnesium, lead, cadmium, and iron. This invention may with appropriate electrodes employ the electrolytes commonly used in the LeClanche system (ammonium chloride and/or zinc chloride), various alkaline electrolytes such as the hydroxides of potassium, sodium, and/or lithium, acidic electrolytes such as sulfuric or phosphoric acid, nonaqueous electrolytes, the electrolytes of course being chosen to be compatible with the positive and negative electrodes.

Among the wide variety of electrochemical systems which may be used in the battery 5 are those in which the positive electrodes comprise manganese dioxide, the negative electrodes comprise metals such as zinc, aluminum, or magnesium, the electrolyte substantially comprises an acidic solution of inorganic salts. Another commonly known system useful in the battery 5 is the alkaline manganese system in which the positive electrode comprise manganese dioxide, the negative electrodes comprise zinc, and the electrolyte substantially comprises a solution of potassium hydroxide. Other aqueous electrolyte systems including those of nickel-zinc, mercury-zinc, mercury-cadmium, and nickel-cadmium may also be used. Systems employing organic positive electrodes and acidic electrolytes may also be used, including rechargeable systems using azodicarbonamide compound electrodes and LeClanche electrolyte.

We claim:

1. An improvement in a flat cell battery comprising the combination of
    (a) at least one flat cell and
    (b) a wrapper consisting of two electrically conductive pieces, each of which is in contact with an end electrode of the battery so as to serve as a terminal for the battery, the wrapper pieces being sealed around the perimeters of the electrodes by moisture impervious, electrically nonconductive sealing means, wherein the improvement comprises an extension of one of the wrapper pieces which extension
    (i) is wrapped around the edge of the battery and is overlaid on the other wrapper piece so that both wrapper pieces are exposed and provide electrical terminals on the same flat face of the battery,
    (ii) is electrically insulated from the wrapper piece over which it is overlaid by electrical insulating means,
    (iii) is sealed by moisture impervious sealing means with the wrapper piece over which it is overlaid so that moisture cannot escape between the two wrapper pieces, and
    (iv) applies substantially no crimping forces against the wrapper piece over which it is overlaid.

2. The improvement of claim 1 wherein the wrapper pieces comprise laminates of metal and electrically conductive plastic, the plastic in each piece being in contact with one of the end electrodes of the battery.

3. The improvement of claim 2 wherein the metal in one of the wrapper pieces is extended beyond the edge of the laminate of which it is a component and wherein the metal extension is wrapped around the edge of the battery and extended to overlay the other wrapper piece.

4. The improvement of claim 1 in which the extension is moisture imperviously sealed to and electrically insultated from the wrapper piece over which it is overlaid by an electrically nonconductive adhesive.

5. The improvement of claim 1 in which the extension is moisture imperviously sealed to and electrically insulated from the wrapper piece over which it is overlaid by an electrically nonconductive heat seal.

6. The improvement of claim 3 in which the extension is moisture imperviously sealed to and electrically insulated from the wrapper piece over which it is overlaid by an electrically nonconductive adhesive.

7. The improvement of claim 3 in which the extension is moisture imperviously sealed to and electrically insulated from the wrapper piece over which it is overlaid by an electrically nonconductive heat seal.

(References on following page)

References Cited

UNITED STATES PATENTS

| | | | |
|---|---|---|---|
| 2,843,650 | 7/1958 | Jacquier | 136—111 |
| 2,870,235 | 1/1959 | Soltis | 136—111 |
| 2,745,894 | 5/1956 | Nowotny | 136—111 |
| 2,880,259 | 3/1959 | Nowotny | 136—111 |
| 3,080,445 | 3/1963 | Brown | 136—111 |
| 3,379,574 | 4/1968 | Grulke et al. | 136—112 X |
| 3,490,952 | 1/1970 | Balaguer | 136—111 |

ANTHONY SKAPARS, Primary Examiner

U.S. Cl. X.R.

136—132, 135